Sept. 27, 1960            A. A. FINK            2,953,859

AUTOMATIC ELECTRICAL TEACHING DEVICE

Filed July 5, 1957            5 Sheets-Sheet 1

INVENTOR.
AUGUST A. FINK

BY Brumbaugh, Free, Graves & Donohue his ATTORNEYS.

Sept. 27, 1960  A. A. FINK  2,953,859
AUTOMATIC ELECTRICAL TEACHING DEVICE
Filed July 5, 1957  5 Sheets-Sheet 2

INVENTOR.
AUGUST A. FINK
BY
Brumbaugh, Free, Graves & Donohue
his ATTORNEYS.

Sept. 27, 1960          A. A. FINK          2,953,859
AUTOMATIC ELECTRICAL TEACHING DEVICE Filed July 5, 1957          5 Sheets-Sheet 3

INVENTOR.
AUGUST A. FINK
BY
Brumbaugh, Free, Graves & Donohue
his ATTORNEYS.

Sept. 27, 1960 A. A. FINK 2,953,859
AUTOMATIC ELECTRICAL TEACHING DEVICE
Filed July 5, 1957 5 Sheets-Sheet 4

INVENTOR.
AUGUST A. FINK
BY
Brumbaugh, Free, Graves & Donohue
his ATTORNEYS.

Sept. 27, 1960   A. A. FINK   2,953,859
AUTOMATIC ELECTRICAL TEACHING DEVICE
Filed July 5, 1957   5 Sheets-Sheet 5
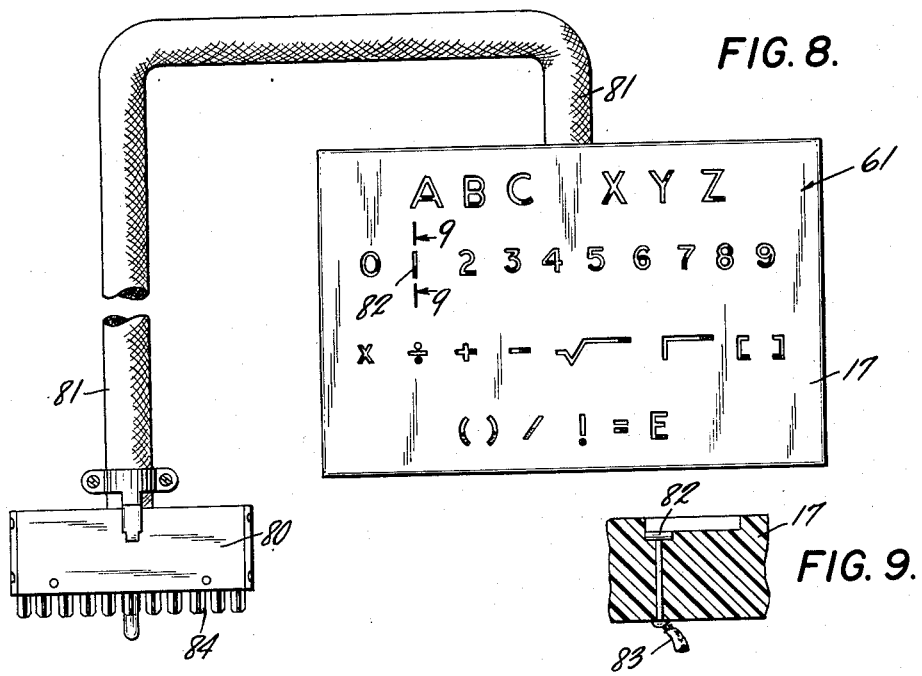
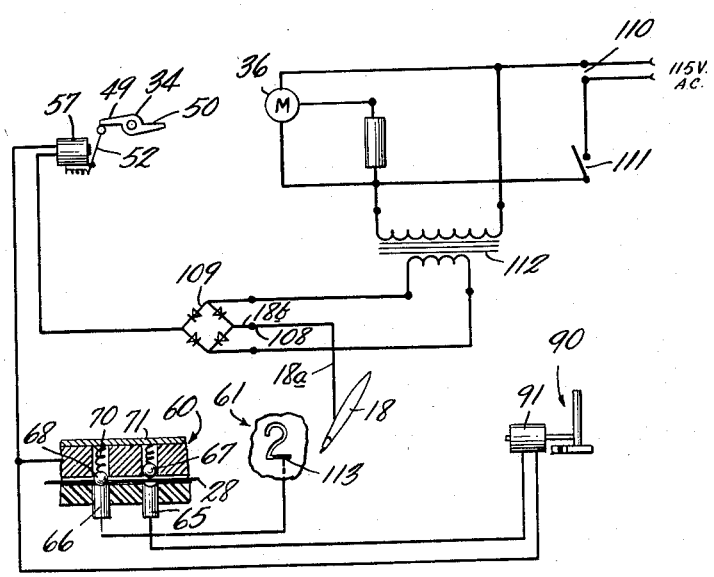
INVENTOR.
AUGUST A. FINK
BY
Brumbaugh, Free, Graves & Donohue
his ATTORNEYS.

2,953,859

AUTOMATIC ELECTRICAL TEACHING DEVICE

August A. Fink, 126 Woods Ave., Roosevelt, N.Y.

Filed July 5, 1957, Ser. No. 670,196

4 Claims. (Cl. 35—9)

This invention relates to a teaching device and, more particularly, to a fully automatic device capable of giving instruction in a wide variety of subject matter.

In the past, two distinct lines of development in the field of teaching aids may be observed. The first and the oldest of these lines is the development of mechanical, visual and auditory aids for use in the classroom. These aids are constructed primarily to help the teacher demonstrate or explain a fact, a system, or a relationship that the student cannot directly experience. Also, these aids replace or supplement verbal description presented by the teacher. The human skeleton in the physiology class, the crystal models in the physics class, and the abacus in the arithmetic class are all examples of this type of device. Even the standard textbook can, in fact, be considered as a teaching aid in this category.

The second line of development is the production of devices that perform the duties ordinarily performed by the teacher. The most widely known example of this type of aid is the educational film. These aids are essentially the same as a classroom lecture. However, they are superior to the usual lecture in that the text of the film can be worded more carefully and demonstrational supports can be more extensive. Basically, nevertheless, it remains a classroom presentation.

Both lines of development accept the classroom format and work within that format. Experimental evidence shows that these devices do aid learning when compared with a straight lecture presentation. However, while increases in the amount learned are apparent, the efficiency of learning remains low. These aids do not appear to point the way to a major increase in teaching efficiency which the current strain on our educational system demands.

The need for a new approach in the area of educational aids becomes more and more evident as research data accumulates. Currently, experimental work in psychology is uncovering techniques that result in dramatic increases in learning efficiency. Unfortunately, many of these techniques are impractical in a classroom setting. For example, immediate reward for a correct response is known to produce an increase in the efficiency of learning. This technique is of little practical use in a classroom where one teacher is faced with twenty-five or thirty children since an immediate reward for correct response for each child is physically impossible. Nevertheless, this is one of the important conditions for efficient learning.

As more and more of these impractical principles are revealed, it becomes obvious that the problem is to develop a practical, but economical, teaching device that will permit the use of these principles. History has long known one such device—the tutor—but, of course, this is not a practical solution for mass education.

The teaching device of the present invention, which will be described in greater detail hereinafter, has been developed to fulfill this urgent need. It creates a learning situation which permits the full use of nearly all of the known principles of learning at a cost which makes its use feasible on a mass educational level. Further, it is sufficiently versatile to provide this situation for a wide variety of subject matter.

A significant advantage which permits the realization of a more efficient job of teaching is that the principles of learning embodied in the present teaching device have been studied experimentally and demonstrated to be critical in modifying behavior. If, in the light of recent work in experimental psychology, the type of situation is specified in which learning will take place with maximum efficiency, and then compare the classroom situation and the teaching device situation with these specifications, the superiority of the present teaching device as an approximation to the ideal learning situation becomes immediately obvious.

The following advantages to a teacher if the present device is incorporated into a school program will be realized: (1) the device will relieve a teacher of almost all of the clerical work which now occupies so much valuble time. No longer will the teacher spend a large amount of time grading papers, correcting workbooks and marking examinations; (2) relieved from routine clerical work, the teacher will be able to spend time in creative classroom work; (3) the teacher will no longer face the major problem of maintaining student interest in unexciting drill work. Teachers, also, will no longer be associated with the unpleasantness of such situations and will be free to enter into a more positive relationship with each child; (4) classroom discipline problems will be greatly reduced as children become more secure in the learning situation characterized by evidence of constant increases in their control of their environment.

The following advantages are realized by the student from the utilization of the present invention: (1) each student is able to progress at his own speed. Bright students are given supplementary "special" tapes if they finish the standard tapes well ahead of the class. Slower students are given longer access to the device without the stigma of present day "special classes"; (2) the teaching device is quite impersonal and therefor does not become emotionally involved with the student in the learning situation. It does not ridicule, become angry, laugh at, or in any way make a child anxious about a subject. Therefore, it cannot cause unhealthy attitudes or emotional sets toward certain types of subject matter. This seems exceptionally important in the light of recent findings concerning student attitudes toward mathematics. The principal finding of a number of studies is that the negative attitude toward mathematics, so prevalent in this country, is a function of the negative attitude toward mathematics on the part of many elementary school teachers; (3) the effect of a single teacher on a student's interest and skill in any area of study will be greatly lowered. This is of particular importance in a sequenced study such as mathematics. In such a study a portion of the sequence poorly learned may make difficult (or impossible) the learning of later phases. Often the poorly learned (or unlearned) step appears early in the sequence. These early difficulties are soon forgotten and later failures of the study are ascribed to the student's inherent inability; (4) there is less chance for a student's academic work becoming impaired due to non-academic factors. The poorly dressed child will receive the same attention as the better dressed. Their advancement will depend more on their ability than on their social status; (5) each student, irrespective of the size of the class, will have the same highly efficient "teacher." The present teaching device will work equally well in any school. This fact is important when it is realized that intellectual ability is not to be restricted to the geographical areas served by good school systems; (6) the teaching device of the present invention will reduce the lag between "new" knowledge and "taught" knowledge. The students will no longer be required to learn outmoded concepts or facts simply because the new material has not yet filtered down to his teacher. New tapes for the present teaching device can be developed and assimilated to the schools in far less time than that required for the training of new teachers; (7) one of the most important contributions that the present device makes to the student is the reduction of mislearning at any level in a student's development. This eliminates the major problem of unlearning these concepts before a higher level of education can be obtained. In the construction of the tape sequence for the present device, this problem can be anticipated such that only techniques and concepts that will support later work will be used. This control can never be achieved under the present system of teacher-to-teacher sequence; and (8) a student's absence from class will be far less serious if devices such as the present teaching device are used. When he returns to class he can pick up exactly where he left off and proceed through the same sequence of events experienced by his classmates. In cases of extended illness, a teaching device can even be sent to the student's home.

Accordingly, a primary object of this invention is to provide an automatic teaching device capable of presenting a wide variety of visual and auditory instruction.

Another important object of this invention is to provide a teaching device which requires that the responses to be learned are made in a form closely resembling the form in which the responses will ultimately be used.

Still another object of this invention is to provide a teaching device that is completely automatic during the teaching session, eliminating all manipulations by the user with the exception of the responses to be learned.

It is also an object of this invention to provide a teaching device that does not permit solutions to problems by spurious clues, such as common position relationships between question and answers.

A further object of the invention is to provide a teaching device which will reduce the probability of guessing a correct response to a point where it is insignificant.

A still further object of the invention is to provide a teaching device that will give the user immediate reward for each correct response and the chain of events leading to the final answer rather than a simple correct-incorrect evaluation of the total configuration of the final answer.

Generally, the teaching device of the present invention contemplates a structure which permits the viewing of each problem of a sequence on a tape and the advancement of the tape upon the selection of each correct answer. A first plurality of switches is positioned in the device such that one switch of this plurality is selected automatically by the tape to correspond to the particular problem viewed. It is then up to the student to select from a plurality of positive answers the answer he deems the correct one for the particular problem viewed. An electrical switch is associated with each of the possible answers such that upon actuation of the switch associated with the correct answer, the tape is automatically advanced to the next successive problem.

The invention further resides in certain novel features of parts, and further objects and advantages thereof will become apparent to those skilled in the art to which it pertains from the following description of the present preferred embodiment thereof, described with respect to the accompanying drawings in which similar reference characters represent corresponding parts in the several views in which:

Figure 8 is a plan view of a response board for use with the teaching device as shown in Figure 1;

Figure 9 is an elevation view taken along the line 9—9 in Figure 8; and

Figure 10 illustrates diagrammatically an electrical circuit for operating the teaching device according to the invention.

Figures 1, 7:
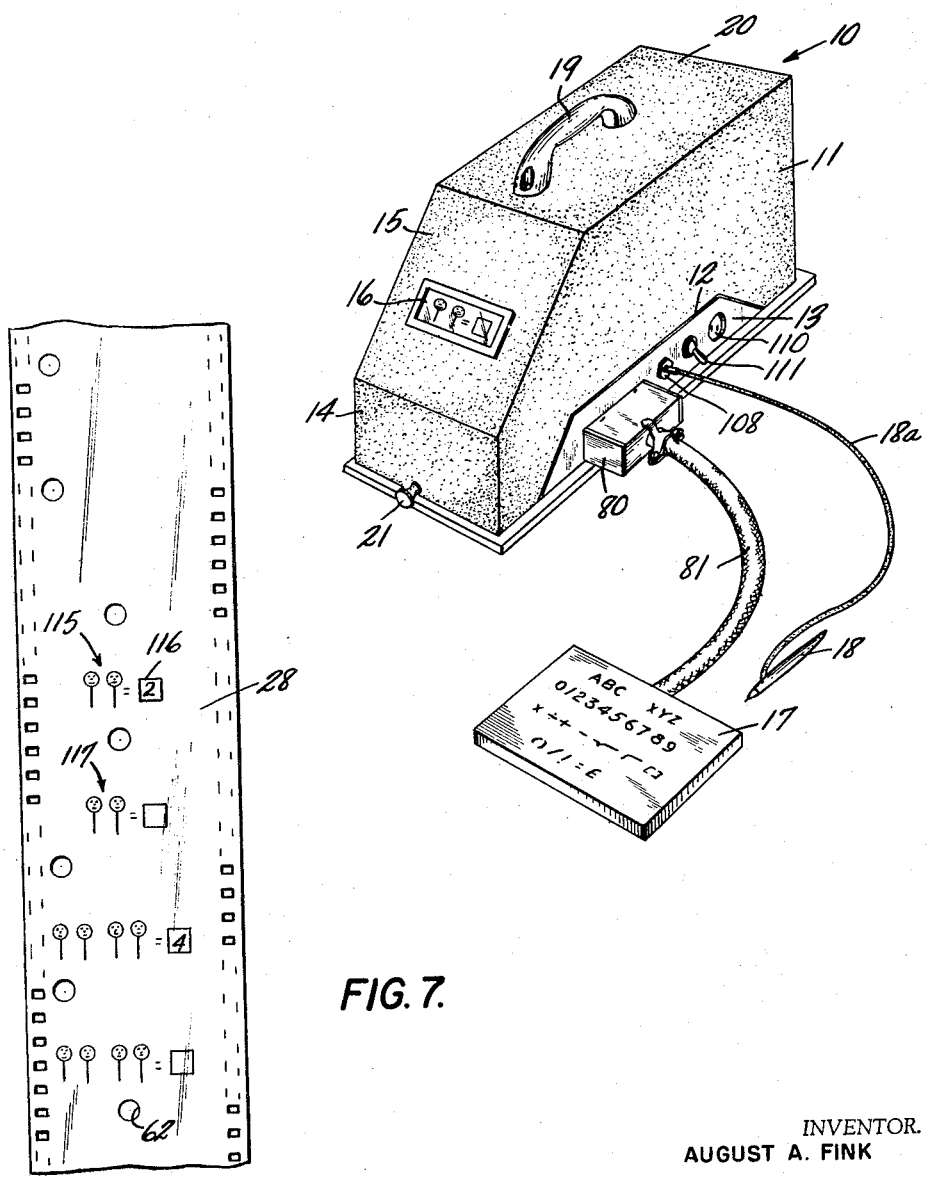
Figure 1 is a view in perspective of a teaching device constructed in accordance with the present invention.
Figure 7 is a plan view of a portion of the tape construction in accordance with the present invention.

Referring now to a representative embodiment of the invention and more particularly to Figure 1 of the drawings, the numeral 10 represents a casing for enclosing the teaching device generally. One side 11 of the casing 10 is cut away as shown at 12 to permit access to a control panel 13. The front of the casing 10 is divided into a substantially vertical surface 14 and a surface 15 inclined at an angle with the surface 14. A viewing window 16 is provided in the inclined surface 15 in order to view selected problems, the answers to which are to be traced on a response board 17 with a stylus 18. The correct answer for the problem shown in the viewing window 16 is "2," which answer when traced on the response board 17 with the stylus 18 will advance the tape to present a new problem at the window 16.

Figure 2:
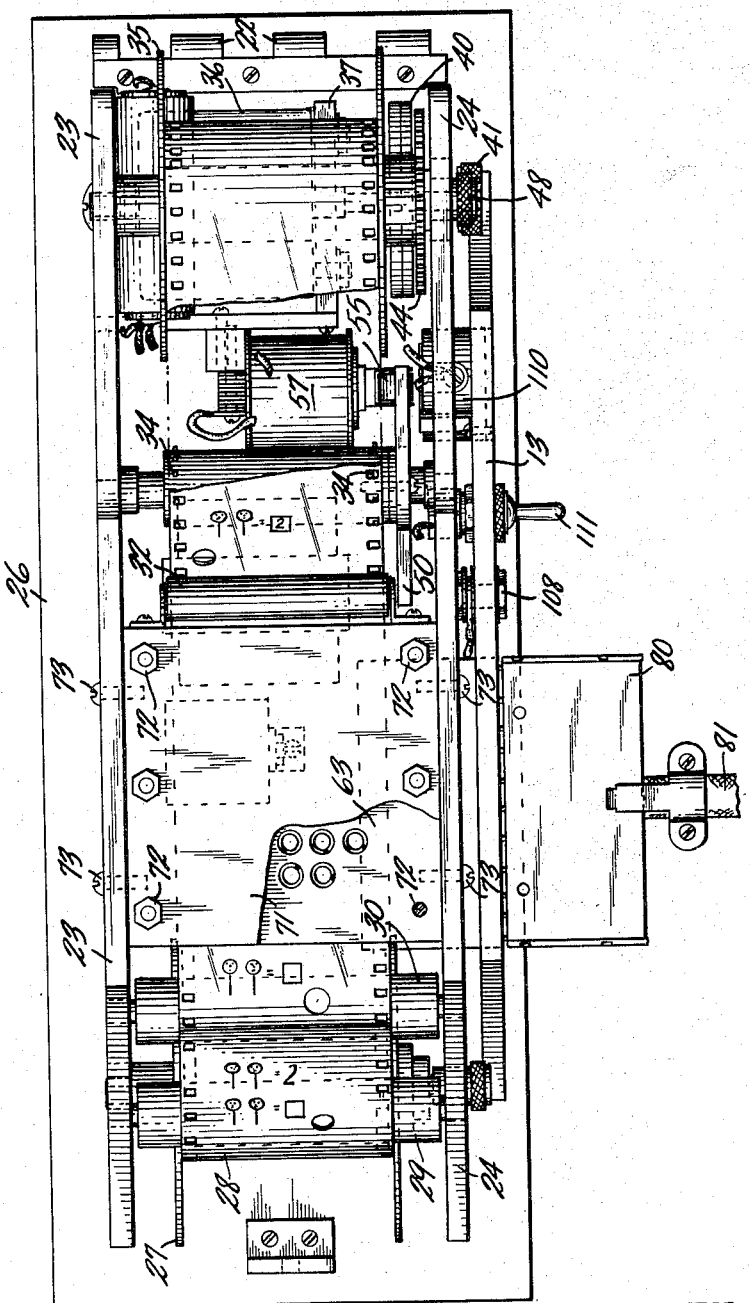
Figure 2 is a plan view of the teaching device with the outer case removed.

As seen in Figure 1, a handle 19 is provided on the top surface 20 for carrying the teaching device. Suitable means such as a thumb screw 21 is threaded through the lower portion of the vertical front surface 14 for locking the casing 10 in place, the casing 10 being hinged at the lower end of the rear surface by a hinge 22, as best seen in Figure 2.

Figure 3:
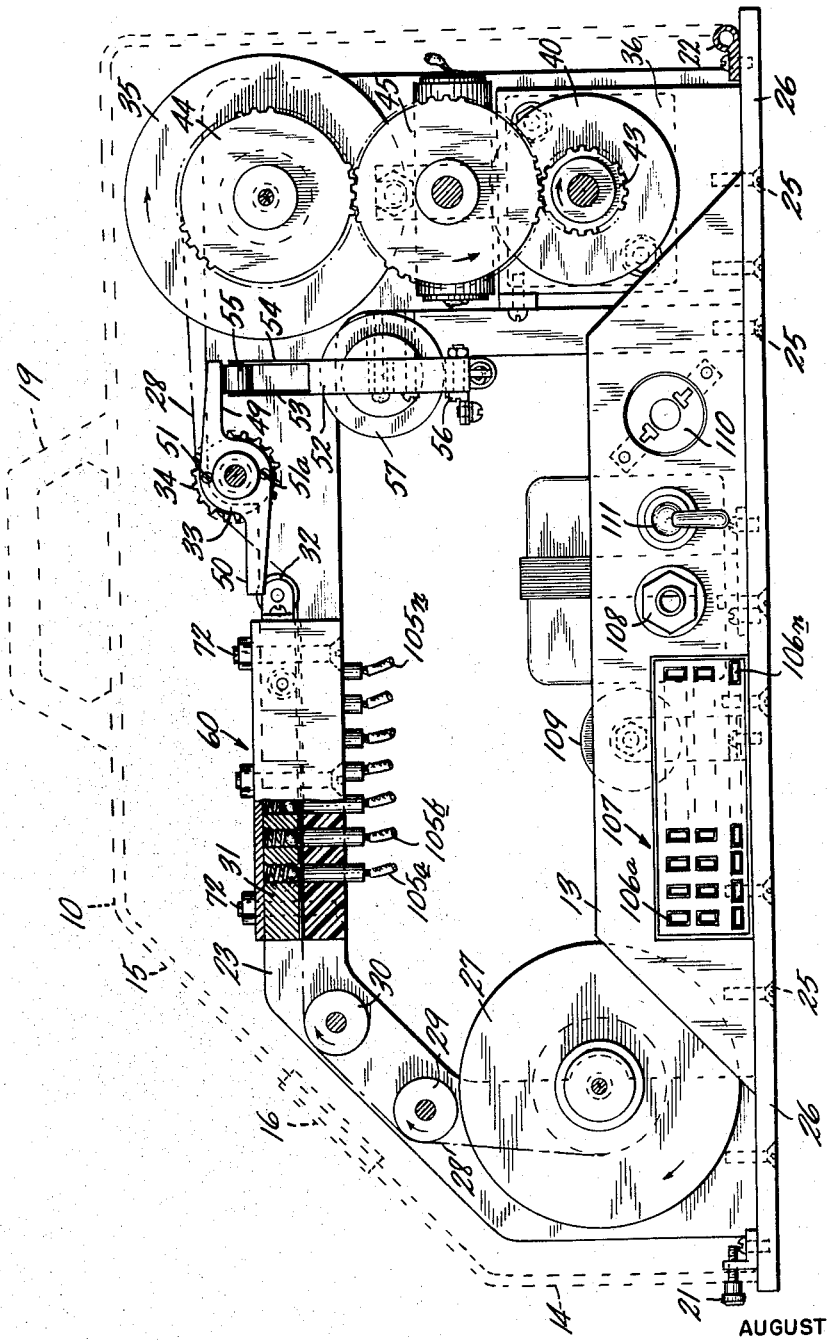
Figure 3 is a side view in elevation of the teaching device.

The teaching device may have any suitable frame or base to support the operating parts. An adequate support is provided in this instance by spaced apart side members 23 and 24, Figure 2, mounted in a substantially vertical position by any suitable means such as the threaded members 25 through a base 26, as shown in Figure 3. A reel 27 is supported between the side members 23 and 24 to contain a supply of tape 28, which reel may be removed by loosening the knob 31. Tracing this tape 28 through the teaching device, it leaves the supply reel 27, passes over support rollers 29 and 30, threads through a first plurality of switches 60 (to be described in greater detail presently), passes under a roller 32, over a roller 33 containing sprockets 34 at each end thereof, and, finally, onto a take-up reel 35.

Figures 4, 5, 6:
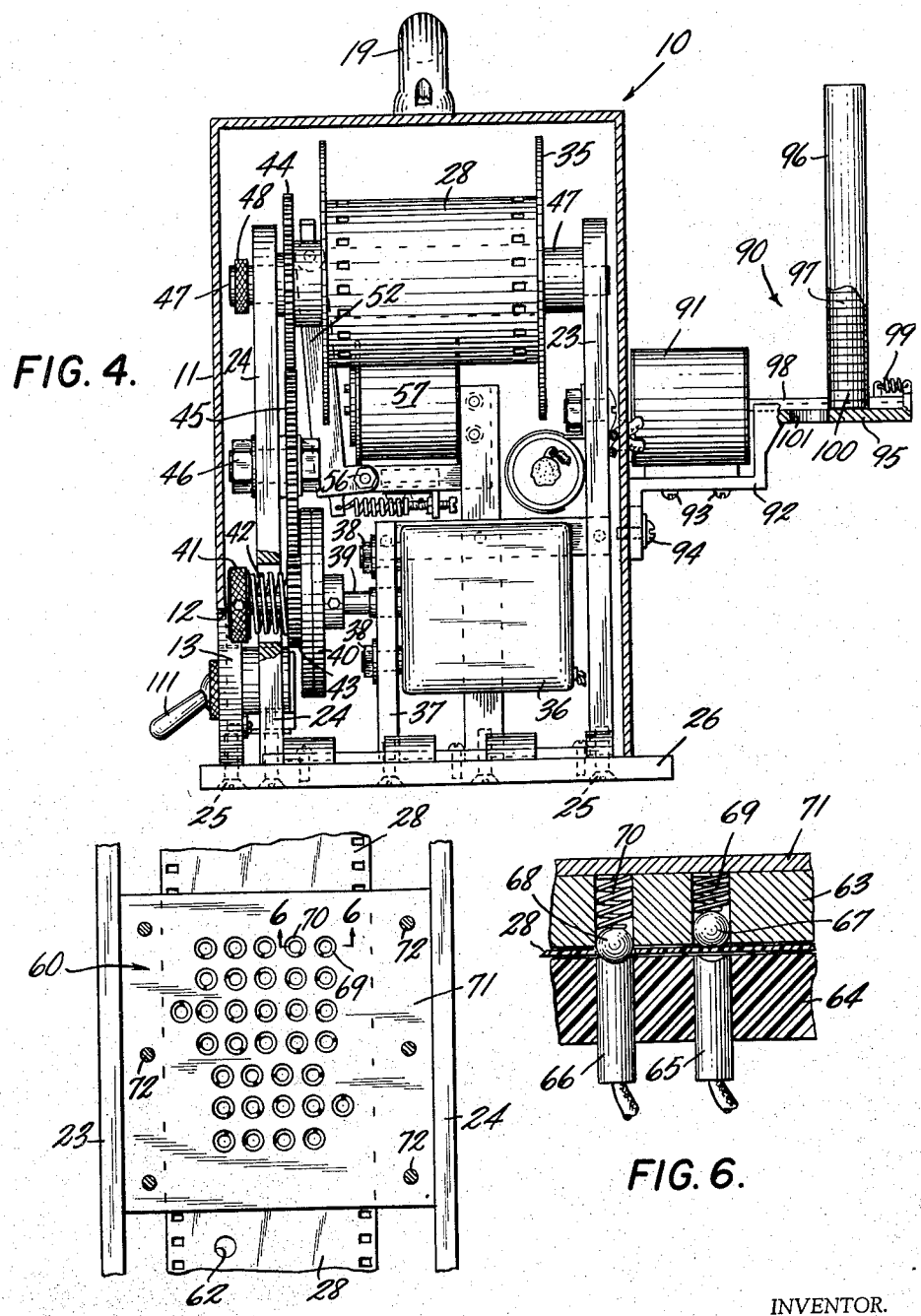
Figure 4 is a rear elevation view shown with the outer casing in section.
Figure 5 is a plan view of a plurality of switches for making contact through selectively positioned apertures in a tape.
Figure 6 is an elevation view taken along the line 6—6 in Figure 5.

Describing first the tape advancement feature of the teaching device, a motor 36, Figure 4, is supported above the base 26 by a suitable structure, such as a vertically extending member 37. Any suitable means may be used to attach the motor 36 to the vertical member 37. A preferred means of attachment is by means of threaded bolts 38 which permits the motor 36 to be removed for maintenance purposes.

A suitable heavy duty clutch 40 is connected directly to a shaft 39 of the motor 36. Tension between the plates of the clutch 40 is adjustable by means of a knurled knob 41 and a compression spring 42. This knob 41 is adjusted such that the plates of the clutch 40 will slip thereby applying a predetermined rotatable force on the gear 43 as the motor 36 rotates. The gear 43 transmits this rotatable force to the gear 44 through an intermediate gear 45 which is journalled on a suitable axle 46 supported by the side member 24. Thus, a continuous force is applied to the take-up reel tending to wind the tape thereon.

Supported on the same shaft 47 as the gear 44 and fixedly attached thereto is the take-up reel 35. The shaft 47 is supported between the side members 23 and 24 and may be removed by loosening the knurled knob 48 when it is desired to replace the reel 35. Although the shaft 47 is continuously urged in a clockwise direction, as viewed in Figure 3, rotation is prevented by the sprocket 34 gripping the edges of the tape 28 and holding it in place. This holding action is obtained by fixing to the same shaft as the sprocket 34 suitable arm members 49 and 50 which in this instance extend in opposite directions at approximately 180° with respect to each other. These arms 49 and 50 are fixedly attached to the sprocket 34 by means of threaded members 51 and 51a, or by any other suitable means.

To hold the sprocket 34 in a fixed position, a lever 52, with spaced apart extensions 53 and 54 supporting a roller 55 between the ends thereof, is interposed such that the arm 49 bears against the roller 55. The opposite end of the lever 52 from the roller 55 is pivotable about an axis 56.

To release the arm 49, a solenoid 57 is actuated by an electrical signal obtained from a correct response by the operator. Upon the actuation of the solenoid 57, the lever 52 is pivoted about the axis 56 toward the solenoid 57 thereby permitting the sprocket 34 to rotate in a clockwise direction, as viewed in Figure 3. As the arm 49 moves in a clockwise direction, the electrical circuit which actuated the solenoid 57 is broken thereby allowing the roller 55 to move into the path of the approaching arm 50 to again stop the tape 28. The operation of this advancement feature in connection with the overall teaching device will be described presently.

The electrical control of the teaching device will now be described referring primarily to Figures 3, 5 and 6 of the drawings. Basically, there are two groups of switches which will be referred to as a first plurality and as a second plurality. The first plurality of switches is indicated generally by the numeral 60 in Figure 5, and the second plurality of switches is indicated generally by the numeral 61 in Figure 8.

Referring now to the first plurality of switches 60, the tape 28 is provided with a plurality of apertures, indicated by the numeral 62 in Figure 5. It should be noted that the essential characteristics of the tape 28 are that it be flexible and that it be electrically insulating. Thus, by providing apertures 62 at predetermined positions along the tape 28, when the tape is stopped in a position to present a desired problem through the viewing window 16, one of these apertures 62 will permit an electrical contact to be made therethrough.

This first plurality of electrical switches 60, Figure 5, is formed by spacing two blocks 63 and 64 apart, Figure 6, to permit the tape 28 to pass therebetween. Figure 6 illustrates two of these switches 60 for illustration purposes. Two lower, fixed terminals 65 and 66, Figure 6, are shown embedded in the electrically insulating block 64. Spherical members 67 and 68 are positioned in suitably located apertures in the block 63 above corresponding lower, fixed terminals, as for example the terminals 65 and 66. Each of these members, illustrated by the two members 67 and 68, is urged downwardly by means of compression springs 69 and 70, respectively, acting between each spherical member and a cover plate 71. The cover plate 71 and the spherical members 67 and 68 are made of suitable electrical conductive material. It can be seen from Figure 6 that when a suitable aperture is positioned at a predetermined point in the tape 28, the electrically conductive spherical member 68 will pass therethrough to form an electrical circuit between the conductive plate 71, the compression spring 70, the spherical member 68 and the lower fixed terminal 66. The closing of this selected contact serves to set up the problem in the electrical circuit, the correct answer to which closes a corresponding switch in the response board 17 completing a series circuit to advance the tape 28 to the next problem. As shown in Figure 3 of the drawings, the blocks 63 and 64 as well as the plate 71 are mounted relative to each other by a plurality of threaded bolts 72 and relative to the other elements of the teaching device by threaded bolts 73 through side members 23 and 24, Figure 2.

It is to be understood, of course, that the specific construction of the switches 60 may be modified, and the invention is not limited to the illustration described. For example, it is conceivable that suitable brush contacts may be substituted for the spherical members, two of which are identified by the numerals 67 and 68 in Figure 6.

The connections for each of the switches in the plurality identified by the numeral 60 is best shown in Figure 3 of the drawings. A separate electrical conductor 105a–105n is fed either separately or by means of a cable to each of the electrical socket members 106a–106n. The overall electrical socket is identified by the numeral 107 and is positioned on the terminal strip 13 to receive the electrical plug 80, Figure 8.

To describe now in detail the second plurality of switches, indicated generally by the numeral 61, reference is made to Figures 8 and 9 of the drawings. A suitable electrical plug 80 provides terminals for one end of each of a plurality of conductors in a cable 81. The opposite end of each conductor in the cable 81 is connected to contacts in the second plurality of switches 61, one terminal being positioned in each character on the response board 17. For example, one terminal of a conductor 83 in the cable 81 is connected to a terminal 82 in the numeral "1" as shown in Figure 9, and the opposite end of this conductor 83 is connected to one of the terminals in the plug 80, possibly terminal 84. A block of electrically insulating material forms the base of the response board 17 into which is inscribed or etched various characters to represent answers to problems appearing on the tape 28. In this manner, one terminal of a plurality of switches is formed, the second terminal of which is a common terminal provided in a stylus 18, Figures 1 and 10. Since there is only one second terminal of this second plurality of switches 61, it is up to the operator to select which of the terminals on the response board 17 corresponds to the closed switch in the first plurality 60 which in turn is determined by the answer to the problem presented at the viewing window 16. Of course, each of the terminals on the response board 17 is hidden from view by, for example, a coating of electrically conducting paint so that the answer must be traced out with the stylus 18.

The electrical conductor 18a, Figure 1, which is connected to the stylus 18, is provided with a suitable plug such that it may be connected electrically with the socket 108 on the terminal strip 13. An electrical conductor 18b electrically connects the socket 108 with a rectifier 109, Figure 10.

Also positioned on this terminal strip 13, as seen in Figure 3, is a receptacle 110 to receive a 115 volt A.-C. supply controlled by an on-off switch 111. The electrical connections of these circuit elements is best seen in Figure 10.

In addition to advancing the tape to present a new problem when the correct answer is obtained to the previous problem, a dispensing apparatus indicated generally by the numeral 90 in Figure 4 may be attached to the teaching device, if desired. One such dispenser which is adaptable to the present device includes an actuating solenoid 91 attached to a suitable support 92 by means of threaded members 93. The support 92 is attached to the casing 10 by means of threaded members 94 and extends outwardly, as at 95, to support a supply chamber 96 containing a plurality of tokens, candy, gum, or any suitable reward 97, one of which will be dispensed for each or any selected advancement of the tape 28.

The operation of this dispenser 90 is controlled, for example, by a separate contact among the plurality of switches 60, this contact being positioned so that it will be actuated at each or any selected advancement of the tape 28, thereby providing an electrical signal to the solenoid 91. Each time the solenoid 91 is energized, the arm 98 will move to the left, as viewed in Figure 4, against the action of the spring 99 to move one token 100 over the discharge aperture 101. The spring 99 will retract the arm 98 when the solenoid 91 is deenergized.

Reference is made now to Figure 10 of the drawings in order to trace through one complete cycle of operation of a teaching device constructed in accordance with the principles of the present invention. The various circuit components have been constructed and arranged in accordance with the previous description and it is now only necessary to apply a 115 volt A.-C. to the receptacle 110, Figure 10, and then close the switch 111 to start the motor 36. As previously described, the motor 36, while running will not rotate or advance the tape 28 due to a clutch 40 interposed between the motor 36 and the sprocket 34.

Upon the closing of the switch 111, 115 volts A.-C. is also applied to the primary of a transformer 112 which provides a voltage at the secondary of approximately 24 volts A.-C. To actuate the various solenoids of the electrical system, this A.-C. voltage must be rectified as by the rectifier 109. From the secondary of the rectifier 109 a simple series circuit is formed by the solenoid 57, the first plurality of switches 60, the second plurality of switches 61, the stylus 18, and back to the rectifier 109.

When the tape 28 is in position to permit the viewing of a selected problem through the viewing window 16, an aperture located according to a predetermined position in the tape 28 permits an electrically conductive spherical member 68 to drop through the aperture under the urging of spring 70 to make contact with a fixed terminal 66. The other conductive spherical members in the first plurality of switches 60, as the member 67, are kept out of contact with the fixed terminals, as the terminal 65, due to the insulation characteristics of the tape 28 when no aperture is located for those contacts.

Thus, the first of the two electrical switches is closed in the simple series circuit. It is now only necessary for the operator of the teaching device to select with the stylus 18 one of the contacts in the second plurality of switches 61 representing the correct answer to the problem viewed, which answer will close the simple series circuit to further advance the tape 28.

Assuming that the answer to the particular problem shown in the viewing window 16 in Figure 1 is "2," the operator will trace the numeral 2 with the stylus 18 touching the contact 113, Figure 10, upon the completion of this trace, thereby completing the circuit which energizes the solenoid 57 to pull the arm 52 out of engagement with the extension 49 permitting the motor 36 to rotate the sprocket 34. However, as soon as the sprocket 34 begins to rotate, the tape 28 is moved such that the contact between the members 68 and 66, Figure 10, is broken. The breaking of the contact through the tape 28 releases the solenoid 57 and permits the arm 52 to swing outwardly again to encounter the arm 50 permitting the sprocket 34 to rotate only 180°. When the advancement of the tape is stopped by the arm 50, a different aperture in the tape 28 permits electrical contact between a different spherical member and fixed terminal to present a new problem requiring a different answer.

Of course it is to be understood that the positioning of these arms 49 and 50 may be other than as shown. For example, a third arm may be added, placing the three arms approximately 120° apart, if desired.

Also, actuated by the advancement of the tape 28 is the dispensing device 90, operated by the solenoid 91. Apertures positioned in any selected pattern (not shown) in the tape 28 may provide for the actuation of the solenoid 91 at each or any selected advancement of the tape in order to dispense one token for each or any selected problem solved.

Having described the teaching device constructed in accordance with the principles of the present invention, it may aid the understanding of the invention to present now a brief description of the particular tape which is adaptable for use with the present device. A portion of such a tape, for exemplary purposes only, is shown in Figure 7 of the drawings. Only one of a great many problems adaptable for this type of teaching is shown on the tape in Figure 7. Therefore, by way of example only, the numeral 115 refers to two illustrations which may be flowers, candy, or any suitable picture and, this being a problem in mathematics, it will be up to the operator (or student) to determine that the answer is "2." In the first instance before the tape is advanced, the answer will be provided in the block 116. Upon seeing this answer, the student will trace the numeral "2" with the stylus 18 thereby completing the series electrical circuit previously described and advancing the tape to present the next problem which, in this case, is similar to the previous problem. It is now up to the student to determine that the picture 117 is similar to the previously seen picture 115 and therefore the answer must be the same, i.e., "2." Accordingly, the student will trace the numeral "2" in the response board 17 with his stylus 18, thereby advancing the tape another step. The progression of this problem or problems will be determined by a laboratory experiment and the particular illustrations just given are for illustraive purposes only and for understanding the nature of the problems to be presented by the teaching device of the present invention. These problems per se form no part of the present invention. Also, it should be noted that the tape 28 may be replaced with other tapes presenting different sequences and the response board 17 will be, at the same time, replaced with another board containing answers to be selected for the particular problems to be viewed.

The invention may be embodied in other specific forms without departing from the essential characteristics thereof. Hence, the present embodiment is, therefore, to be considered in all respects merely illustrative and not as being restrictive, the scope of the invention being indicated by the appended claims rather than by the foregoing description, and all modifications and variations as fall within the meaning and purview and range of equivalency of the appended claims are therefore intended to be embodied therein.

I claim:

1. A teaching device which comprises means to carry a tape for displaying a sequence of problems, means to view one of said problems at a time, electrical means to advance said tape means in response to a signal, a first switch means actuated by said tape means in accordance with the problem viewed, said first switch means being one of a first plurality of similar switch means, a second plurality of switch means, each of said second plurality of switch means being electrically connected in series with predetermined ones of said first plurality of switch means such that said signal is produced only by the selection of the switch means in said second plurality which is electrically connected in series with said first switch means, a response board to contain said second plurality of switch means, a plurality of marks on said board to indicate possible answers to problems viewed, each of said second plurality of switch means being positioned in proximity of respective marks on said response board to be closed, respectively, when a correct answer is selected corresponding to the problem viewed, and means to detachably connect said response board to said device so that different boards containing different marks are attachable to correspond with other questions on a different tape means.

2. The teaching device as described in claim 1 and as characterized by a stylus to manually select the correct response to a problem presented and actuating said second of said corresponding switches by tracing said correct response.

3. In a teaching device, the combination comprising means to carry a tape for displaying a sequence of problems, means to view one of said problems at a time, motor means to advance said tape means, means to maintain said tape means stationary to present a problem to said viewing means, electrical means to permit said motor means to advance said tape means in response to a signal, a plurality of switch means to provide said signal from simultaneous actuation of at least two predetermined switches, a response board connected to said device, one of said two predetermined switches being positioned on said response board, a traceable mark on said response board associated with said one of said two switches, and a hand manipulatable stylus connected electrically to said device for operation of said one of said two switches when the correct mark is traced.

4. In a teaching device, the combination comprising means to carry a tape for displaying a sequence of problems, means to view one of said problems at a time, first reel means on which said tape means is stored, second reel means on which said tape means is advanced, said first and said second reel means being positioned on opposite sides of said viewing means, motor means to advance said tape means at selected intervals, stopping means to maintain said tape means stationary to present a problem to said viewing means, electrical means to control said stopping means and to permit said motor means to advance said tape means in response to a signal, a plurality of switch means to provide said signal from simultaneous actuation of at least two predetermined switches, a response board to contain at least one of said predetermined switches, a plurality of marks on said board to indicate possible answers to problems viewed, means to detachably connect said response board to said device, and a hand manipulatable stylus for operation of said electrical means when the mark indicating the correct answer is traced thereby.

References Cited in the file of this patent

UNITED STATES PATENTS

| | | |
|---|---|---|
| 2,030,175 | LeFevre | Feb. 11, 1936 |
| 2,511,202 | Fulboam | June 13, 1950 |
| 2,627,672 | Polton | Feb. 10, 1953 |
| 2,879,549 | Craine | Jan. 27, 1959 |